United States Patent
Ikeda et al.

(10) Patent No.: US 8,822,062 B2
(45) Date of Patent: Sep. 2, 2014

(54) POWER-SUPPLY DEVICE WITH TERMINAL CLIPPING PIECES

(75) Inventors: Tomohiro Ikeda, Makinohara (JP); Keizo Aoki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 377 days.

(21) Appl. No.: 12/851,211

(22) Filed: Aug. 5, 2010

(65) Prior Publication Data

US 2011/0045329 A1    Feb. 24, 2011

(30) Foreign Application Priority Data

Aug. 18, 2009   (JP) .................................. 2009-188949

(51) Int. Cl.
| | |
|---|---|
| H01M 2/24 | (2006.01) |
| H01M 10/48 | (2006.01) |
| H01R 13/11 | (2006.01) |
| H01M 2/20 | (2006.01) |
| H01M 2/30 | (2006.01) |
| H01M 10/04 | (2006.01) |

(52) U.S. Cl.
CPC ........... H01M 10/482 (2013.01); H01R 13/113 (2013.01); H01M 2/206 (2013.01); H01M 2/307 (2013.01); H01M 10/0413 (2013.01); Y02E 60/12 (2013.01)
USPC ........... 429/160; 429/149; 429/156; 439/180; 439/828; 439/829

(58) Field of Classification Search
CPC ....... H01M 2/20; H01M 2/204; H01M 2/206; H01M 2/30; H01R 13/11; H01R 13/113
USPC ........... 429/160, 149, 156; 439/180, 828, 829
See application file for complete search history.

(56) References Cited

U.S. PATENT DOCUMENTS

| | | | |
|---|---|---|---|
| 2001/0046816 A1* | 11/2001 | Saito et al. ................... | 439/736 |
| 2004/0192097 A1* | 9/2004 | Mills et al. ................... | 439/212 |
| 2005/0014423 A1* | 1/2005 | Roepke ........................ | 439/856 |
| 2006/0205289 A1 | 9/2006 | Kumakura | |
| 2008/0139056 A1* | 6/2008 | Kumakura .................... | 439/866 |
| 2010/0210152 A1* | 8/2010 | Byrne .......................... | 439/856 |

FOREIGN PATENT DOCUMENTS

| | | |
|---|---|---|
| CN | 2643495 Y | 9/2004 |
| JP | 2001-110396 A | 4/2001 |
| JP | 2006269104 A | 10/2006 |

OTHER PUBLICATIONS

Chinese Office Action dated Jan. 6, 2013 issued in corresponding Chinese Patent Application No. 201010257207.9.

* cited by examiner

*Primary Examiner* — Zachary Best
(74) *Attorney, Agent, or Firm* — Sughrue Mion, PLLC

(57) ABSTRACT

The power-supply device includes: a battery assembly composed of a plurality of batteries each having a positive electrode end and a negative electrode end, said batteries overlapped with each other in a manner that electrodes having the different polarities are adjacent to each other; a plurality of bus bars connecting the batteries in series by connecting the adjacent electrodes having the different polarities in the battery assembly; and a terminal having an electric contact part attached to each bus bar, and a wire connecting part continued to the electric contact part, and attached to an electric wire connected to a voltage measuring device for measuring a voltage of the battery. The electric contact part includes a pair of clipping pieces disposed with a gap from each other, and connected to the bus bar by press-inserting the bus bar into between the clipping pieces.

6 Claims, 7 Drawing Sheets

POWER-SUPPLY DEVICE WITH TERMINAL CLIPPING PIECES

CROSS REFERENCE TO RELATED APPLICATIONS

This application is on the basis of Japanese Patent Application No. 2009-188949, the contents of which are hereby incorporated by reference.

BACKGROUND OF THE INVENTION

1. Field of the Invention

The present invention relates to a power-supply device composed of a plurality of batteries connected in series, and mounted on a hybrid vehicle movable with both an internal-combustion engine and an electric motor drive, an electric vehicle, or the like.

2. Description of the Related Art

For example, a power-supply device 901 shown in FIG. 11 is mounted on a hybrid vehicle movable with both an internal-combustion engine and an electric motor drive, an electric vehicle, or the like. The power-supply device 901 includes: a plurality of batteries 903 in which different polarity electrodes 932, 933 are arranged adjacent to each other; a bus bar 904 for connecting the batteries 903 adjacent to each other; a terminal 905 for connecting a voltage measuring device (not shown) configured to measure a potential difference between a positive electrode 932 (namely, anode) and a negative electrode 933 (namely, cathode) of the battery 903 connected to the bus bar 904; and a plate having a plurality of bus bar receiving parts 919 for receiving the bus bar 904 and the terminal 905.

A pair of bus bar holes 904a for inserting the anode 932 and the cathode 933 is formed on the bus bar 904. The bus bar 904 connects the anode 932 and the cathode 933 of the different batteries 903 adjacent to each other by inserting the anode 932 into one bus bar hole 904a and inserting the cathode 933 into the other bus bar hole 904a.

The terminal 905 includes: a tabular main part 915; and a connecting part 925 configured to connect the main part 915 to the voltage measuring device. The terminal 905 is connected to the voltage measuring device to measure electric potentials of the electrodes 932, 933. The main part 915 is overlapped with the bus bar 904. The main part 915 includes: a terminal hole 915a into which either of electrodes 932, 933 is inserted; an intruding part 935 for inserting into a slit 949 of a later-described bus bar receiving part 919; and an abutting part 945 provided at a position abutting on a terminal rotation stopper 939 when rotating around either of the electrodes 932, 933 after either of the electrodes 923, 933 is inserted into the terminal hole 915a. The intruding part 935 is disposed adjacent to the abutting part 945.

The plate 909 is overlapped with upper walls of a plurality of batteries 903, and includes a plurality of bus bar receiving parts 919 each in which the bus bar 904 and the terminal 905 are received. The bus bar receiving part 919 includes: a bottom wall 919a with which the bus bar 904 is overlapped; and a partitioning wall 919b extending vertically from both edges of the bottom wall 919a. The partitioning wall 919b includes: a bus bar locking part 929 for locking the bus bar 904 on the bus bar receiving part 919; and the terminal rotation stopper 939 disposed adjacent to the bus bar locking part 929. The terminal rotation stopper 939 is formed in a substantially C-shape so as to surround both ends of the slit 949 into which the intruding part 935 of the terminal 905 is inserted, and projected from an outer surface of the partitioning wall 919b.

The power-supply device 901 having an above-described configuration is assembled as follows. The bus bar 904 is overlapped with the bottom wall 919a of the bus bar receiving part 919, and the bus bar locking part 929 locks the bus bar 904 in the bus bar receiving part 919. Then, the main part 915 of the terminal 905 is overlapped with the bus bar 904, and the intruding part 935 of the terminal 905 is inserted into the slit 949 of the bus bar receiving part 919. Then, the plate 909 to which the bus bar 904 and the terminal 905 are attached is overlapped with the upper walls of a plurality of batteries 903. Then, the plate 909 to which the bus bar 904 and the terminal 905 are attached is screwed with a nut to be fixed to batteries 903. When the nut is screwed, the abutting part 945 of the terminal 905 abuts on an inner wall of the terminal rotation stopper 939 to prevent the terminal 905 from rotating around the electrodes 932, 933. Further, the intruding part 935 of the terminal 905 is inserted into the slit 949 formed on the partitioning wall 919b to prevent the terminal 905 from rotating around the electrodes 932, 933.

[Patent Document 1] JP, A, 2001-110396

However, when the nut is screwed, for preventing the terminal 905 from rotating around the electrodes 932, 933, the terminal rotation stopper 939 is provided on the plate 909. Therefore, the plate 909 is inclined to have a complex shape. Accordingly, there is a problem that a used amount of resin material for the plate 909 is increased.

Accordingly, an object of the present invention is to provide a power-supply device configured to reduce a used amount of resin material and to reduce material cost.

SUMMARY OF THE INVENTION

In order to attain the object, according to the present invention, there is provided a power-supply device including:

a battery assembly composed of a plurality of batteries each having a positive electrode at one end of the battery and a negative electrode at the other end of the battery, said batteries overlapped with each other in a manner that electrodes having the different polarities are adjacent to each other;

a plurality of bus bars connecting the batteries in series by connecting the adjacent electrodes having the different polarities in the battery assembly; and a terminal having an electric contact part attached to each bus bar, and a wire connecting part continued to the electric contact part, and attached to an electric wire connected to a voltage measuring device for measuring a voltage of the battery, wherein the electric contact part includes a pair of clipping pieces disposed with a gap from each other, and connected to the bus bar by press-inserting the bus bar into between the clipping pieces.

Preferably, the wire connecting part includes: a pair of side boards facing each other, and extending vertically from both edges of a bottom board to which the electric wire is arranged; and a press-contact blade projected inward from the side boards, and connected to a core wire of the electric wire by penetrating an insulating cover of the electric wire.

Preferably, the power-supply device further including:

a plurality of first receiving parts configured to respectively receive the bus bars and the electric contact parts attached to the bus bars;

a plurality of second receiving parts continued to the first receiving parts, and configured to respectively receive the wire connecting parts to which the electric wires are attached; and a plate configured to be overlapped with the battery assembly, wherein each second receiving part includes: a bottom wall on which the wire connecting part to which the electric wire is attached is mounted; and a pair of side walls extending vertically from both edges of the bottom wall, and positioning the wire connecting part into between the side walls.

Preferably, the wire connecting part extends in a direction perpendicular to a longitudinal direction of the electric contact part, and extends along an outer periphery of the bus bar.

Preferably, the wire connecting part is folded back at a joint point with the electric contact part, and the wire connecting part and the electric contact part are overlapped with each other.

These and other objects, features, and advantages of the present invention will become more apparent upon reading of the following detailed description along with the accompanied drawings.

DETAILED DESCRIPTION OF THE PREFERRED EMBODIMENTS

First Embodiment

Figure 1:
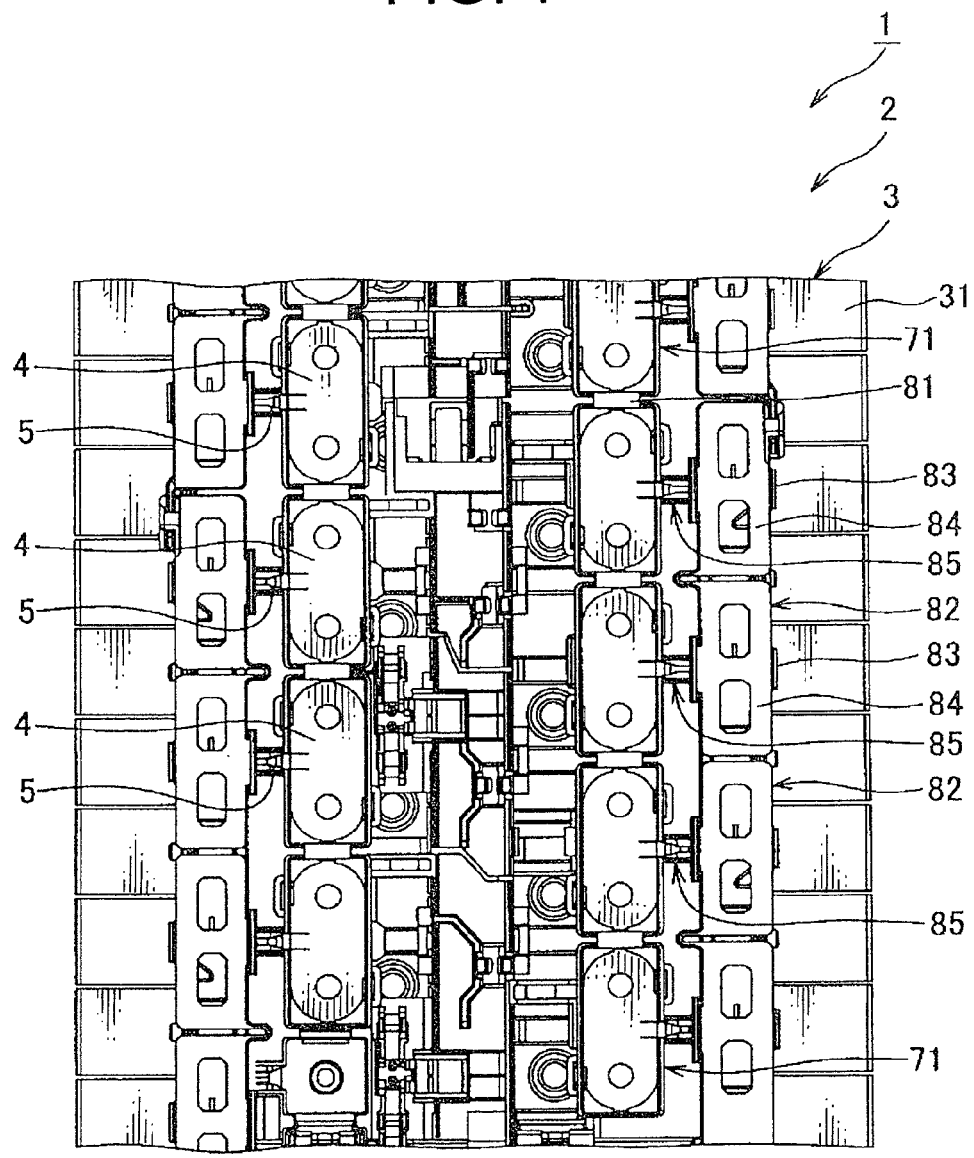
FIG. 1 is a top view showing a power-supply device according to the first embodiment of the present invention.
Figure 2:
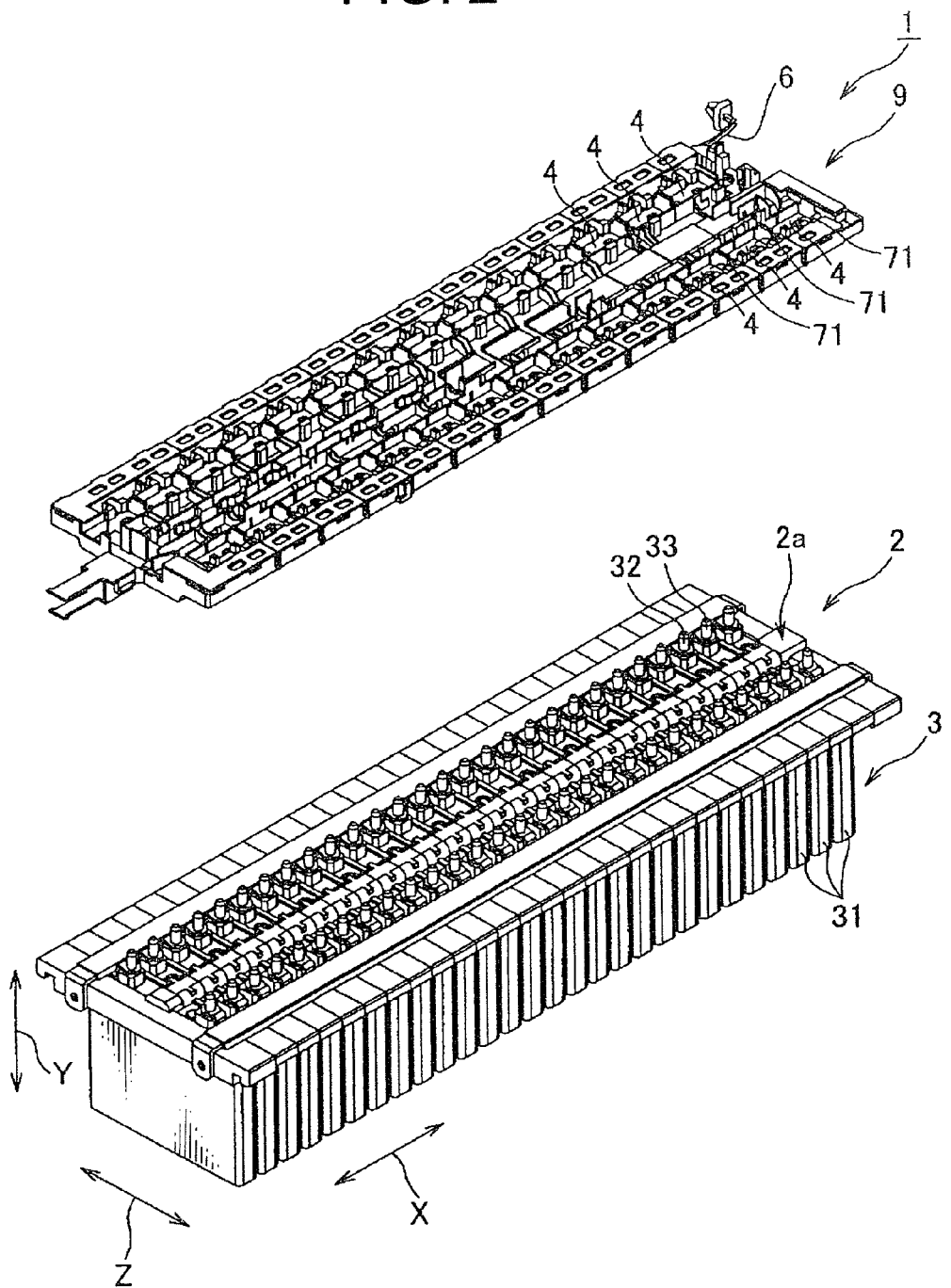
FIG. 2 is an explanatory view for explaining an assembling operation of the power-supply device shown in FIG. 1, and showing a condition that a plate to which a terminal is attached is overlapped with a battery assembly.
Figure 3:
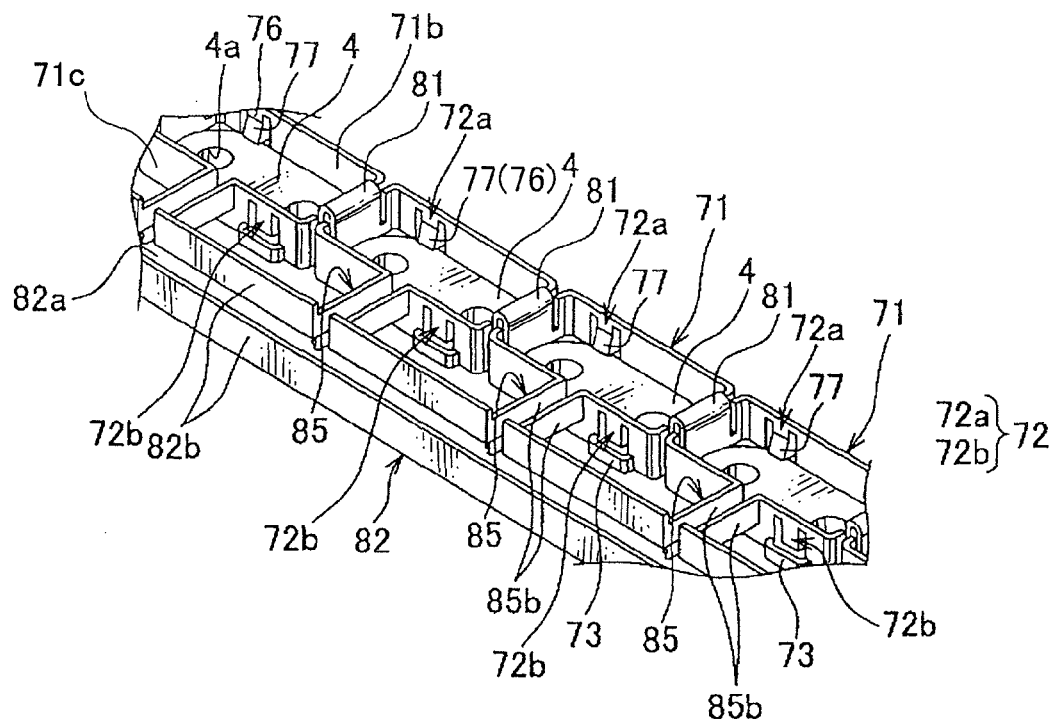
FIG. 3 is an explanatory view for explaining an assembling operation of the power-supply device shown in FIG. 1, and showing the plate into which the terminal is attached.
Figure 4:
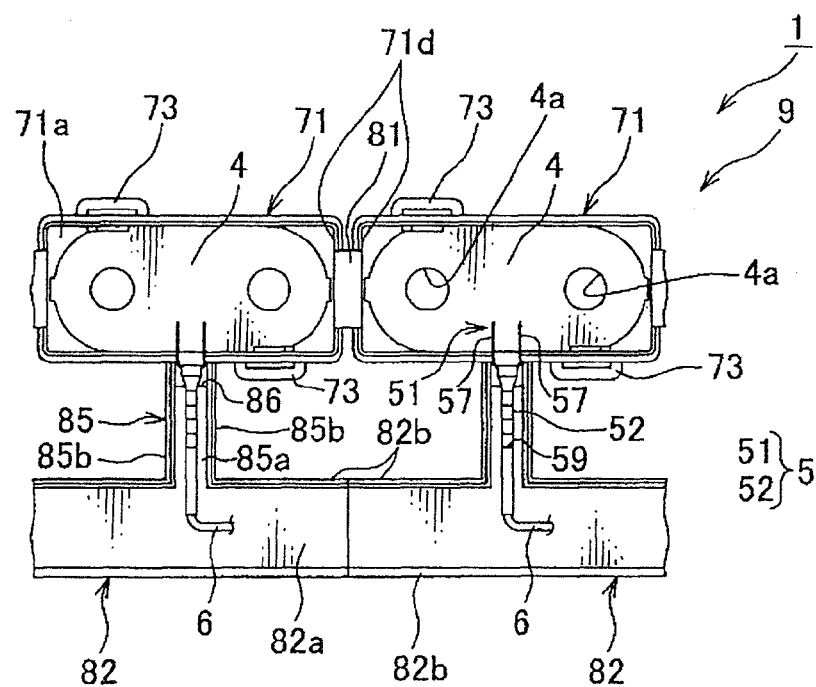
FIG. 4 is a top view showing the power-supply device shown in FIG. 3.
Figure 5:
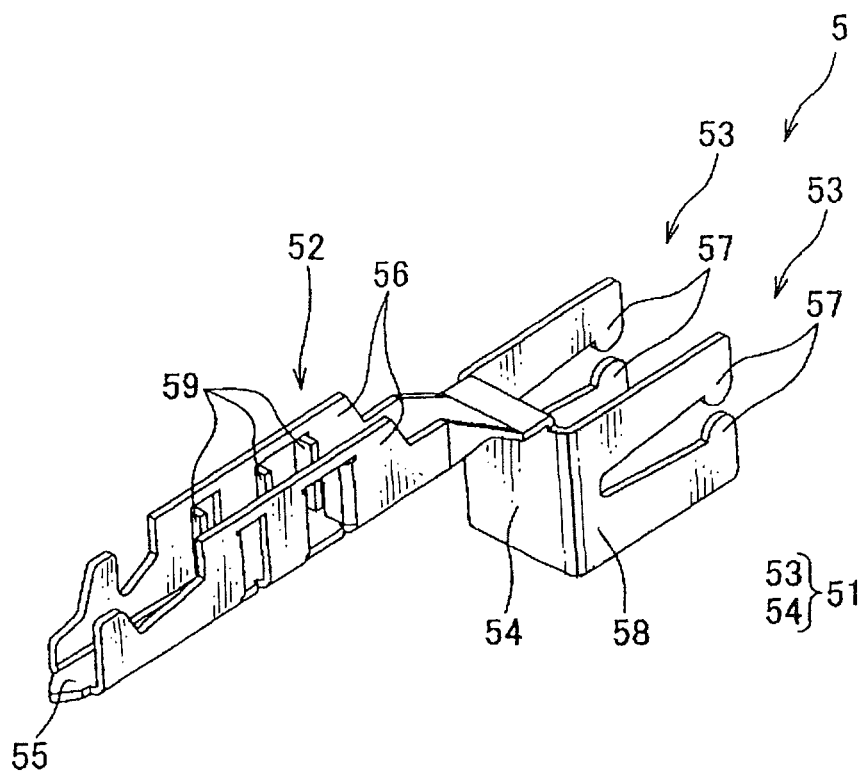
FIG. 5 is a perspective view showing the terminal of the power-supply device shown in FIG. 1.
Figure 6:
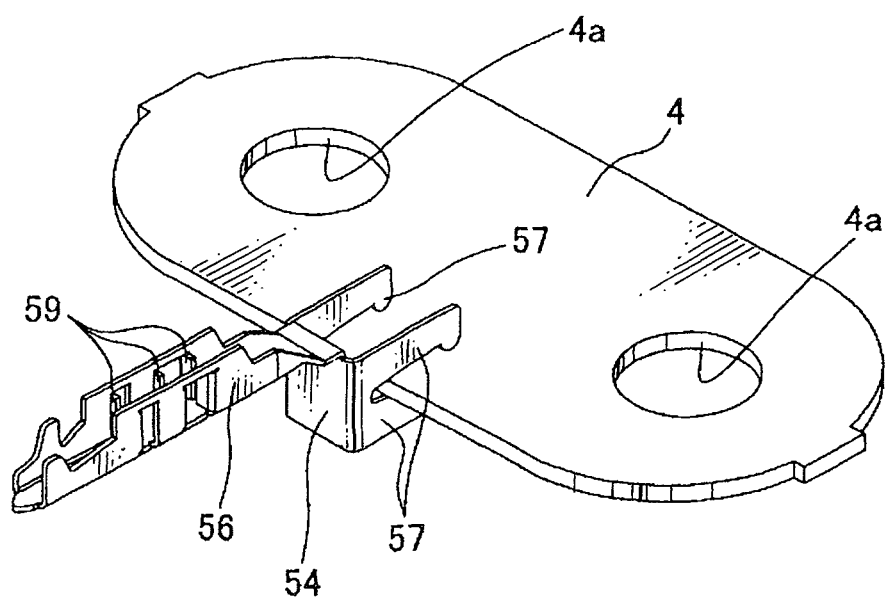
FIG. 6 is an explanatory view for explaining an assembling operation of the power-supply device shown in FIG. 1, and showing a condition that the terminal is attached to a bus bar.

A power-supply device 1 according to the first embodiment of the present invention will be explained with reference to FIGS. 1 to 6. FIGS. 3 and 4 show a condition that a cover of a plate is removed. The power-supply device 1 is mounted on a hybrid vehicle which runs with a driving force of both an internal-combustion engine and an electric motor, and an electric vehicle which runs with the driving force of the electric motor.

The power-supply device 1 includes: a battery assembly 2 composed of a plurality of batteries 3 connected in series; a plurality of bus bars 4 connecting the batteries 3 in series by connecting electrodes 32, 33 of the batteries 3 adjacent to each other of the battery assembly 2; and a plurality of terminals 5 attached to each bus bar, and attached to an electric wire connected to a voltage measuring device for measuring a voltage of the battery; and a plate 9 for receiving these and overlapped with the battery assembly 2.

The battery assembly 2 includes: a plurality of batteries 3; and a fixing member (not shown) for overlapping and fixing the batteries each other. Further, as shown in FIG. 2, each battery 3 includes: a box-shaped battery main body 31; and a pair of electrodes 32, 33 respectively projected from one end and the other end of an upper wall of the battery main body 31. The electrode 32 is a positive electrode (namely, anode), and the electrode 33 is a negative electrode (namely, cathode). These electrodes 32, 33 are made of conductive metal, and formed in a cylinder shape. Further, the batteries 3 are alternately inversely overlapped with each other so that the anode 32 and the cathode 33 of the adjacent batteries 3 are arranged adjacent to each other. The plate 9 is overlapped with an upper wall 2a of the battery assembly 2. Incidentally, in FIG. 2, an arrow X indicates an overlapping direction of the batteries 3 and a longitudinal direction of the battery assembly 2, an arrow Z indicates a width direction of the battery assembly 2, and an arrow Y indicates a height direction of the battery assembly 2.

The bus bar 4 includes a pair of bus bar holes 4a for inserting the anode 32 and the cathode 33. The bus bar 4 is made of conductive metal, and formed in a band plate shape. The bus bar 4 is received in a later-described first receiving part 71 of the plate 9. When the anode 32 is inserted into one bus bar hole 4a, and the cathode 33 is inserted into the other bus bar hole 4a, and a not-shown nut is screwed, the bus bar 4 is fixed to the battery 3. Thus, the bus bar 4 connects the electrodes 32, 33 having the different polarities of the batteries adjacent to each other.

The bus bar hole 4a is a circular shape in a plan view. The bus bar hole 4a penetrates the bus bar 4. The pair of bus bar holes 4a is disposed in substantially the middle of the bus bar with a gap. An inner periphery of the bus bar 4a is so formed as to contact an outer periphery of each of the electrodes 32, 33.

The terminal 5 is made by punching and folding a conductive metal plate. The terminal 5 includes: an electric contact part 51 having a pair of clipping pieces 57 (shown in FIGS. 5 and 6) into which the bus bar 4 is press-inserted; and a wire connecting part 52 continued to the electric contact part 51, and to which an electric wire 6 (shown in FIG. 4) connected to a voltage measuring device for measuring a voltage of the battery 3 is attached. The terminal 5 is connected to the later-described voltage measuring device via the electric wire 6. The terminal 5 outputs the voltages of the anode 32 and the cathode 33 of the batteries 3 connected to the bus bar 4 to the voltage measuring device.

The electric contact part 51 includes: a pair of press-contact terminals 53; and a joint plate 54 jointing the press-contact terminals 53. The press-contact terminal 53 includes: a pair of clipping pieces 57 disposed with a gap, and into which the bus bar 4 is press-inserted and connected; and a joint piece 58 jointing the pair of clipping pieces 57. Each clipping piece 57 is formed straight. The pair of clipping pieces 57 is parallel to each other, and disposed with a gap. When the electric contact part 51 (namely, the terminal 5) is attached to the bus bar 4, the pair of clipping pieces 57 is disposed parallel to the arrow Z.

The wire connecting part 52 is composed of a bottom plate 55 on which surface the electric wire 6 is positioned, and a pair of side plates 56 extended vertically from both edges in a width direction of the bottom plate 55, and facing to each other. The wire connecting part 52 is continued to an edge of the joint plate 54, and disposed in a direction away from the pair of clipping pieces 57.

Press-contact blades 59 for penetrating an insulating cover (not shown) covering a core wire (not shown) of the electric wire 6 are respectively provided on the pair of side plates 56. The press-contact blade 59 is formed by notching a part of the side plate 56 in a substantially C shape. Namely, the press-contact blade 59 is a part of the side plate 56. The pair of press-contact blades 59 is facing to each other, and projected inward of the wire connecting part 52. A plurality of pairs of the press-contact blades 59 is provided. Three pairs of the press-contact blade 59 are arranged with a gap along the longitudinal direction of the bottom plate 55. Thus, the press-contact blades 59 electrically connect the electric wire 6 and the terminal 5 (namely, the wire connecting part 52), and prevent the electric wire 6 from being displaced in the longitudinal direction of the wire connecting part 52.

One end of the electric wire 6 is attached to the wire connecting part 52, and the other end of the electric wire 6 is connected to the later-described voltage measuring device. The electric wire 6 attached to the wire connecting part 52 (namely, the terminal 5) is routed in a later-described wire receiving part 82. The electric wire 6 is so-called coated electric wire 6 in which a conductive core wire (not shown) is covered by an insulating cover (not shown). Further, the electric wire 6 is a round wire having a circular section.

The plate 9 has a substantially rectangular shape corresponding to the upper wall 2a of the battery assembly 2. The plate 9 is overlapped with the upper wall 2a of the battery assembly 2. The plate 9 integrally includes: a plurality of first receiving parts 71 for receiving respectively the bus bar 4 and the electric contact part 51 attached to the bus bar 4; joint members 81 for jointing the first receiving parts adjacent to each other; wire receiving parts 82 for receiving each electric wire 6 connected to each terminal 5 by arranging wire receiving parts 82 in a straight shape and parallel to an arranging direction of the first receiving parts 71; a plurality of covers 84 (shown in FIG. 1) each of which is connected to the wire receiving part 82 via a hinge 83 (shown in FIG. 1) for opening and closing an opening of the wire receiving part 82; and a plurality of second receiving parts 85 each of which is continued to the first receiving part 71 and respectively receives the wire connecting part 52 of the terminal 5 to which the electric wire 6 is attached.

The first receiving parts 71 are arranged along a longitudinal direction of the plate 9 (namely, the arrow X direction). Further, two columns of the first receiving parts 71 are arranged in a width direction of the plate 9 (namely, the arrow Z direction) with a gap. Further, each first receiving part 71 is formed in a box shape, and composed of a bottom wall 71a (shown in FIG. 4) of which surface the bus bar 4 is positioned, a first partitioning wall 71b extended vertically from an edge of the bottom wall 71a, and parallel to the arrow X, a second partitioning wall 71c facing the first partitioning wall 71b, and a pair of third partitioning walls 71d (shown in FIG. 4) jointing the first and second partitioning walls 71b, 71c and facing each other. Each first receiving part 71 includes: a locking arm 72 for locking the bus bar 4 in the first receiving part 71, and a frame wall 73 surrounding and reinforcing the locking arm 72.

A pair of electrode insertion holes (not shown) for respectively inserting the anode 32 and the cathode, and a clipping piece insertion hole (not shown) for inserting the pair of clipping pieces 57 into which the bus bar 4 is press-inserted are formed on the bottom wall 71a. The electrode insertion holes and the clipping piece insertion hole penetrate the bottom wall 71a.

Two locking arms 72 are provided at one first receiving part 71. A locking arm 72a is disposed on the first partitioning wall 71b near the anode 32, and the locking arm 72b is disposed on the second partitioning wall 71b near the cathode 33.

The locking arm 72a has a substantially C-shaped slit (not shown) between the locking arm 72a and the first partitioning wall 71b, and includes: an arm main body 76 (shown in FIG. 3) of which one end away from the bottom wall 71a is continued to the first partitioning wall 71b, and the other end near the bottom wall 71a is formed in a free end; and a locking projection 77 formed on the free end of the arm main body 76. The arm main body is elastically deformable toward an inside of a bus bar 4 receiving portion.

The locking arm 72b has a substantially C-shaped slit (not shown) between the locking arm 72b and the second partitioning wall 71c, and includes: an arm main body 76 of which one end away from the bottom wall 71a is continued to the second partitioning wall 71c, and the other end near the bottom wall 71a is formed in a free end; and a locking projection 77 formed on the free end of the arm main body 76.

The locking projection 77 is projected toward an inside of the first receiving part 71. The locking projection 77 is formed parallel to an upper wall 2a of the battery assembly 2. When the bus bar 4 is received in the first receiving part 71, the locking projection 77 abuts on a surface of the bus bar 4.

Two frame walls 73 are provided on each first receiving part 71. Two frame walls 73 are respectively formed on outer surfaces of the partitioning walls 71b, 71c, and projected outwardly from the first receiving part 71. Further, the frame wall 73 is formed in a substantially C-shape, and parallel to an upper wall 2a of the battery assembly 2.

The joint member 81 joints the first receiving parts 71 adjacent to each other, and is integrally formed with the third partitioning walls 71d adjacent to each other. The joint member 81 has a substantially C-shaped cross-section.

The wire receiving part 82 is arranged along the longitudinal direction of the plate 9 (namely, arrow X direction). Two rows of the wire receiving parts 82 are arranged with a gap along the width direction of the plate 9 (namely, arrow Z direction). A plurality of first receiving parts 71 are arranged between the two rows of the wire receiving parts 82. Each wire receiving part 82 is formed in a gutter shape with a bottom wall 82a on which surface the electric wire 6 is positioned, and side walls 82b extending vertically from both edges of the bottom wall 82a in the arrow Z direction.

The second receiving parts 85 are arranged along the longitudinal direction of the plate 9 (namely, arrow X direction). Each second receiving part 85 is formed in a gutter shape with a bottom wall 85a continued to the bottom wall 82a of the wire receiving part 82, and a pair of side walls 85b extending vertically from both edges of the bottom wall 85a, and continued to the side wall 82b of the wire receiving part 82. The other end side of the electric wire 6 received in the second receiving part 85 is bent in a substantially right angle, and received in the wire receiving part 82. Incidentally, the side wall 85b corresponds to the "side wall" in claims.

The wire connecting part 52 and the one end of the electric wire 6 attached to the wire connecting part 52 are positioned on a surface of the bottom wall 85a (shown in FIG. 4). When the plate 9 is overlapped with the upper wall 2a of the battery assembly 2, the bottom wall 85a is positioned further away from the upper wall 2a of the battery assembly 2 than the bottom wall 71a of the first receiving part 71. Thus, the bottom plate 55 of the wire connecting part 52 is positioned on a surface of the bottom wall 85*a*, and the bus bar 4 into which the wire connecting part 52 is attached is positioned on a surface of the bottom wall 71*a*.

A clipping piece insertion hole 86 is provided at an end of the bottom wall 85*a* near the first receiving part 71. The clipping piece insertion hole 86 is continued to the above-described clipping piece insertion hole of the first receiving part 71. Thus, the electric contact part 51 into which the bus bar 4 is attached to is inserted into the clipping piece insertion hole of the first receiving part 71 and the clipping piece insertion hole 86 adjacent to each other, and the bus bar 4 is positioned on a surface of the bottom wall 71*a* of the first receiving part 71. Further, the wire connecting part 52 of the terminal 5 is positioned on a surface of the bottom wall 85*a* of the second receiving part 85.

The voltage measuring device is a not-shown ECU (Electronic Control Unit). The ECU measures a potential difference between the anode 32 and the cathode 33 of each battery 3.

Next, an assembling procedure of the above-described power-supply device 1 will be explained. Before the power-supply device 1 is assembled, the plate 9, the bus bar 4, the terminal 5, and the like have been separately produced. Then, the bus bar 4 is moved close to the bottom wall 71*a* of the first receiving part 71 so as to be overlapped with the bottom wall 71*a*, and the locking arms 72*a*, 72*b* respectively clip the bus bar 4 between the bottom wall 71*a* of the first receiving part 71 and the locking projection 77. Then, the bus bar 4 is pressed onto the bottom wall 71*a* of the first receiving part 71 so that the bus bar 4 is locked on the first receiving part 71. Alternatively, the bus bar 4 may be previously insert-molded into each first receiving part 71. Next, the one end of the electric wire 6 is press-inserted toward the bottom plate 55 of the wire connecting part 52 of the terminal 5. Then, the press-contact blade 59 of the wire connecting part 52 penetrates the insulating cover of the electric wire 6 and is connected to the core wire of the electric wire 6. Thus, the electric wire 6 is attached to the terminal 5, and the electric wire 6 and the terminal 5 are electrically connected to each other. Next, the bus bar 4 is press-inserted into between a pair of clipping pieces 57 of the electric contact part 51 of the terminal 5 to which the electric wire 6 is attached. Thus, the terminal 5 is attached to the bus bar 4, and the terminal 5 and the bus bar 4 are electrically connected to each other.

Next, as shown in FIG. 2, while the bus bar 4 to which the terminal 5 is attached is attached to the first receiving part 71, the plate 9 is overlapped with the upper wall 2*a* of the battery assembly 2. At this time, an end of the plate 9 in the longitudinal direction is overlapped with an end of the battery assembly 2 in the arrow X direction, and the electrodes 32, 33 positioned at one end of the battery assembly 2 in the arrow X direction are inserted into the electrode insertion holes of the plate 9 and the bus bar holes 4*a* of the bus bar 4. Then, nuts are screwed with the electrodes 32, 33 which are inserted into the electrode insertion holes and the bus bar holes 4*a* so that the bus bar 4 and the plate 9 are fixed to the battery assembly 2. Thus, the power-supply device 1 is assembled.

Thus, the anode 32 and the cathode 33 adjacent to each other are electrically connected to each other with the bus bar 4. Thus, a plurality of batteries 3 are electrically connected to each other in series. The terminal 5 is electrically connected to the ECU as the voltage measuring device via the electric wire 6. The terminal 5 outputs the potentials of the anode 32 and the cathode 33 which are attached to the terminal 5 to the ECU. The ECU measures the potential difference between the anode 32 and the cathode 33 facing each other in a direction across the arrow X direction. Thus, the power-supply device 1 can measure a remaining charge of each battery 3.

According to the first embodiment, the terminal 5 includes a pair of clipping pieces 57. Further, the terminal 5 is connected to the bus bar 4 when the bus bar 4 is press-inserting into between the pair of clipping pieces 57. Thus, the terminal 5 is attached to the bus bar 4 without screwing the nut. Therefore, the conventional terminal rotation stopper 939 of the power-supply device 901 is unnecessary. Therefore, the plate 9 has a simple structure. According to the simple structure of the plate 9, a molding die for molding the plate 9 may be also a simple structure. Thus, a used amount of resin material for the plate 9 is reduced and material cost of the power-supply device 1 is reduced.

Further, the wire connecting part 52 of the terminal 5 includes: the bottom plate 55 on which the electric wire 6 is routed; and a pair of side walls 56 facing each other, and extended from both edges of the bottom plate 55. The side walls facing each other are projected inwardly and have press-contact blades 59 for penetrating the insulating cover of the electric wire 6 and being connected to the core wire of the electric wire 6. Therefore, a simple operation to press-insert the electric wire 6 toward the bottom plate 55 of the wire connecting part 52 allows the electric wire 6 to be attached to the terminal 5. Therefore, assembling workability of the electric wire 6 attached to the terminal 5 is increased.

Further, the wire connecting part 52 of the terminal 5 is positioned between the pair of side walls 85*b* of the second receiving part 85. Thus, when the electric contact part 51 of the terminal 5 attached to the bus bar 4 is moved along the outer periphery of the bus bar 4, because the electric contact part 51 abuts on the side wall 85*b* of the second receiving part 85, the electric contact part 51 (namely, the terminal 5) is prevented from moving.

Second Embodiment

Figure 7:
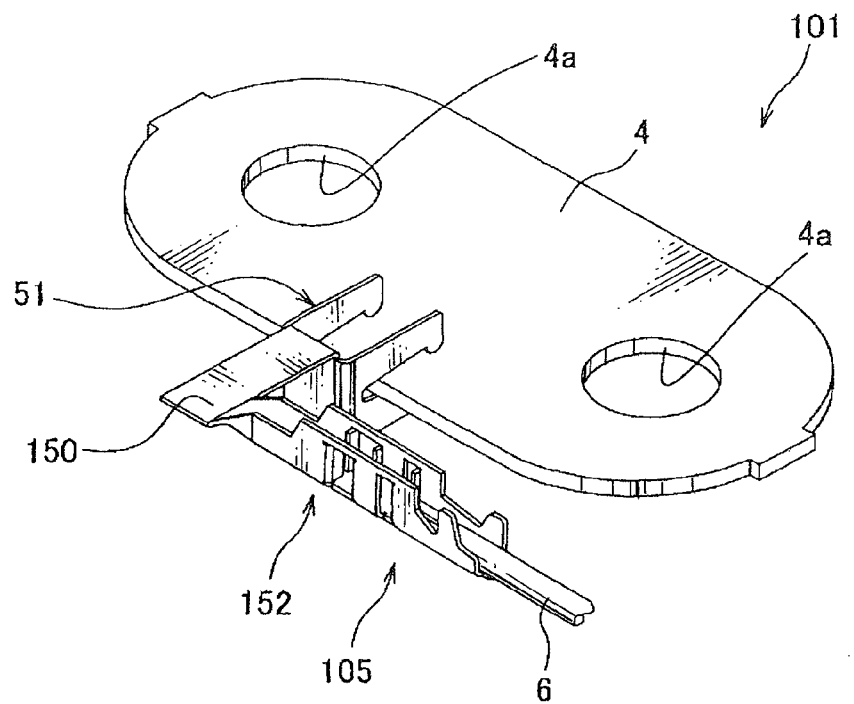
FIG. 7 is a perspective view showing a condition that the terminal of the power-supply device according to the second embodiment is attached to the bus bar.
Figure 8:
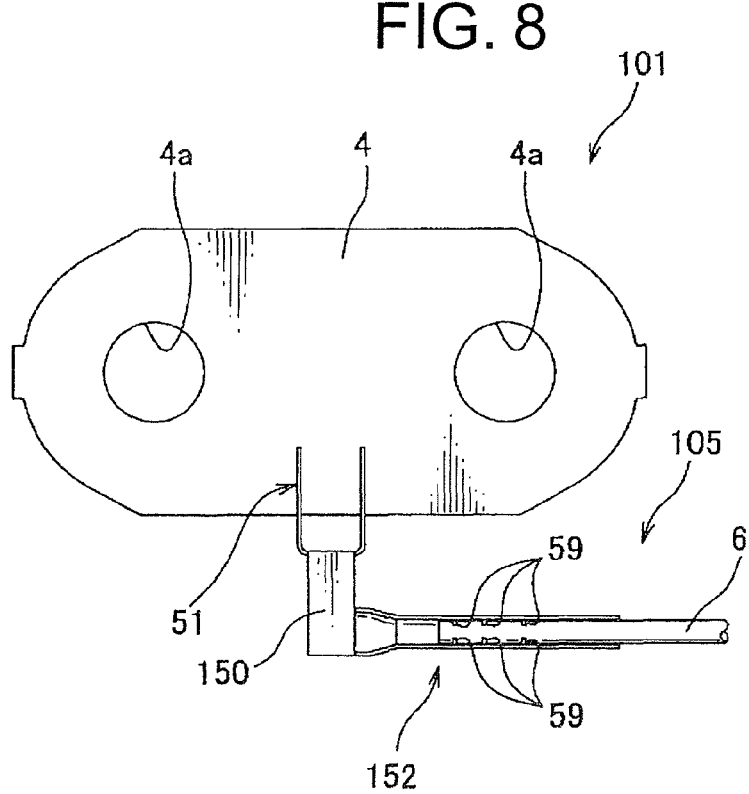
FIG. 8 is a top view of the terminal and the bus bar shown in FIG. 7.

The power-supply device 101 according to the second embodiment of the present invention will be explained with reference to FIGS. 7 and 8. The power-supply device 101 is mounted on a hybrid vehicle which runs with a driving force of both an internal-combustion engine and an electric motor, and an electric vehicle which runs with the driving force of the electric motor.

The power-supply device 101 includes: a battery assembly 2 composed of a plurality of batteries 3 connected in series; a plurality of bus bars 4 connecting the batteries 3 in series by connecting electrodes 32, 33 of the batteries 3 adjacent to each other of the battery assembly 2; and a plurality of terminals 105 attached to each bus bar, and attached to an electric wire connected to a voltage measuring device (not shown) for measuring a voltage of the battery; and a plate 9 for receiving these and overlapped with the battery assembly 2.

The terminal 105 is made by punching and folding a conductive metal plate. The terminal 105 includes: the electric contact part 51 having a pair of clipping pieces 57 into which the bus bar 4 is press-inserted; a wire connecting part 152 to which an electric wire 6 connected to a voltage measuring device for measuring a voltage of the battery 3 is attached; and a joint part 150 for jointing the electric contact part 51 and the wire connecting part 152, and positioning the wire connecting part 152 in a direction perpendicular to a longitudinal direction of the electric contact part 51. The terminal 105 is connected to the later-described voltage measuring device via the electric wire 6. The terminal 105 outputs the voltages of the anode 32 and the cathode 33 of each battery 3 connected to the bus bar 4 to the voltage measuring device.

A longitudinal direction of the wire connecting part 152 is provided parallel to a longitudinal direction of the bus bar 4 (namely, extended along an outer periphery of the bus bar 4). The wire connecting part 152 is composed of the bottom plate 55 on which surface one end of the electric wire 6 is positioned, and a pair of side plates 56 facing each other, and extended vertically from both edges of the bottom plate 55 in a width direction.

According to the above-described second embodiment, the wire connecting part 152 is arranged perpendicular to the longitudinal direction of the electric contact part 51. Thus, a size of the second receiving parts 85 of the plate 9 in the longitudinal direction (namely, arrow Z direction) can be reduced. Further, the second receiving parts 85 (namely, plate 9) can be smaller. Further, because the electric wire 6 is routed without being bent, the electric wire 6 can be routed without being damaged by a deformation of warpage or the like.

Third Embodiment

Figure 9:
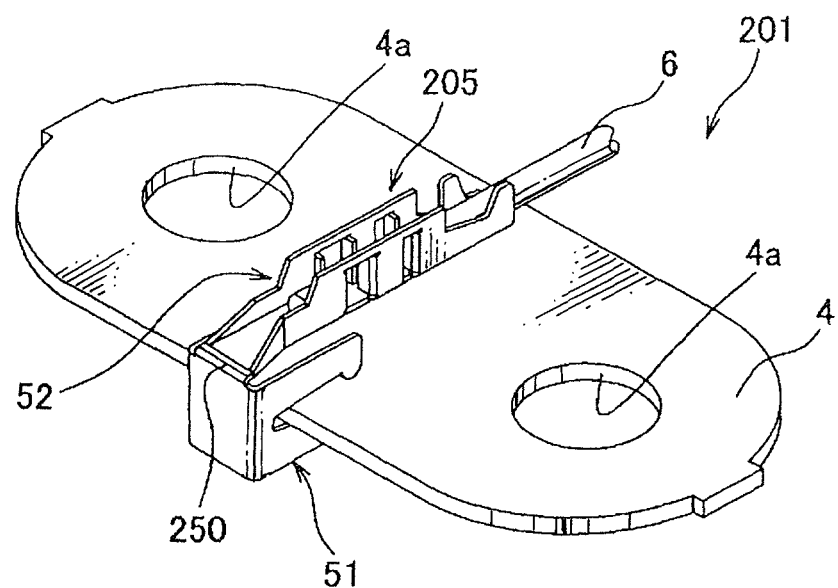
FIG. 9 is a perspective view showing a condition that the terminal of the power-supply device according to the third embodiment is attached to the bus bar.
Figure 10:
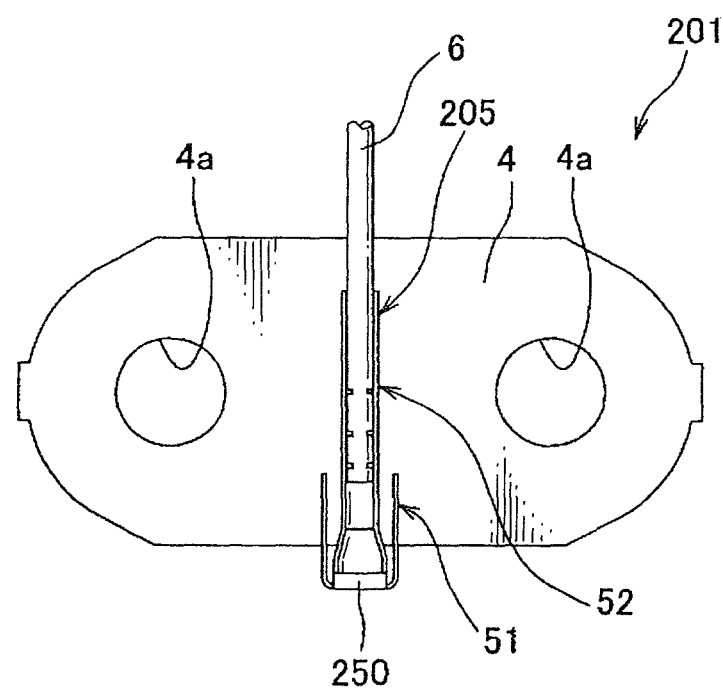
FIG. 10 is a top view of the terminal and the bus bar shown in FIG. 9.
Figure 11:
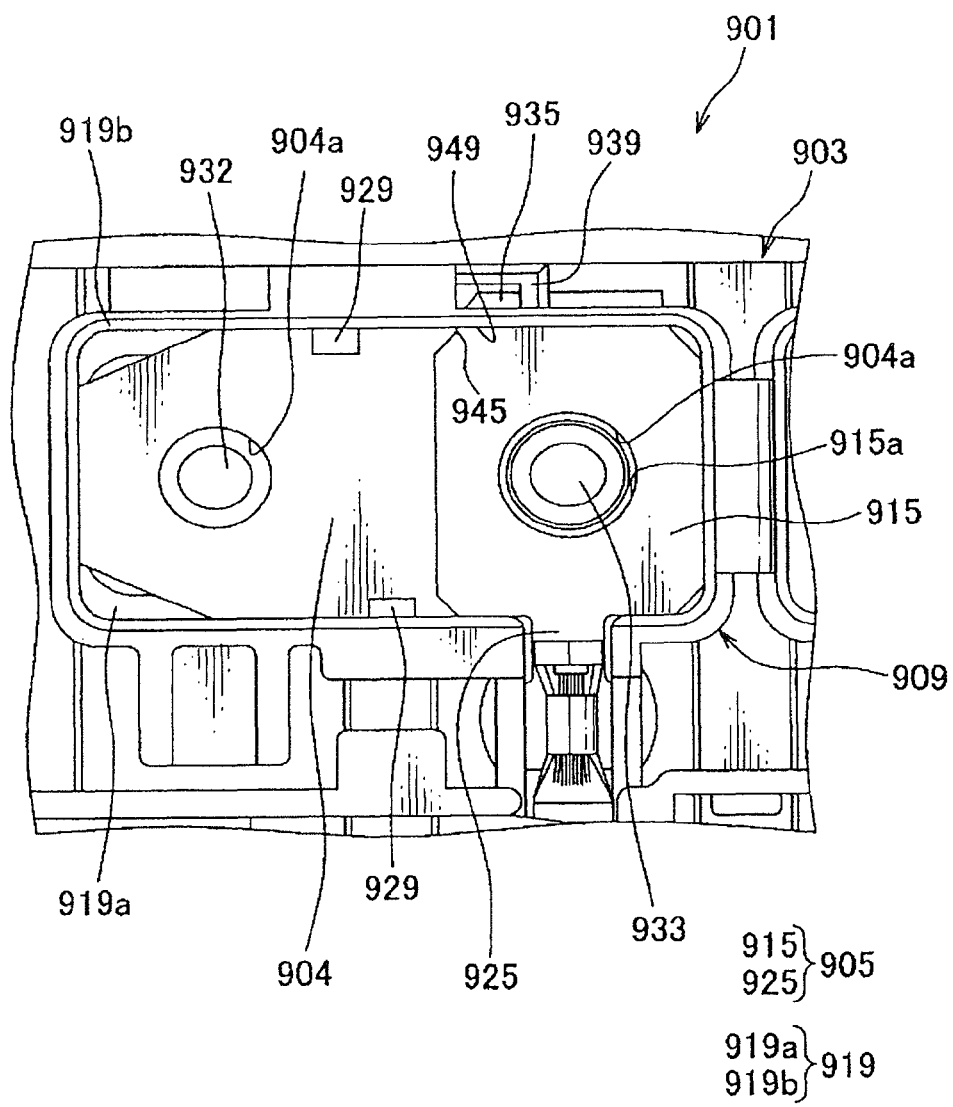
FIG. 11 is a top view showing a conventional power-supply device.

A power-supply device 201 according to the third embodiment of the present invention will be explained with reference to FIGS. 9 and 10. The power-supply device 201 is mounted on a hybrid vehicle which runs with a driving force of both an internal-combustion engine and an electric motor, and an electric vehicle which runs with the driving force of the electric motor.

The power-supply device 201 includes: a battery assembly 2 composed of a plurality of batteries 3 connected in series; a plurality of bus bars 4 connecting the batteries 3 in series by connecting electrodes 32, 33 of the batteries 3 adjacent to each other of the battery assembly 2; and a plurality of terminals 205 attached to each bus bar, and attached to an electric wire connected to a voltage measuring device (not shown) for measuring a voltage of the battery; and a plate 9 for receiving these and overlapped with the battery assembly 2.

The terminal 205 is made by punching and folding a conductive metal plate. The terminal 205 includes: the electric contact part 51 having a pair of clipping pieces 57 into which the bus bar 4 is press-inserted; and the wire connecting part 52 to which an electric wire 6 connected to a voltage measuring device for measuring a voltage of the battery 3 is attached. The electric contact part 51 is folded back at a joint point 250 with the wire connecting part 52, and the electric contact part 51 and the wire connecting part 52 are overlapped with each other. The terminal 205 is connected to the later-described voltage measuring device via the electric wire 6. The terminal 205 outputs the voltages of the anode 32 and the cathode 33 of each battery 3 connected to the bus bar 4 to the voltage measuring device.

According to the above-described third embodiment, the electric contact part 51 is folded back at a joint point 250 with the wire connecting part 52, and the electric contact part 51 and the wire connecting part 52 are overlapped with each other. Thus, a size of the second receiving parts 85 of the plate 9 in the longitudinal direction (namely, arrow Z direction) can be reduced. Further, the second receiving parts 85 (namely, plate 9) can be smaller.

Incidentally, a control unit for equally control a plurality of batteries 3 may be attached to the terminals 5, 105, 205. In this case, equalized voltage is outputted to the ECU.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power-supply device comprising:

a battery assembly composed of a plurality of batteries each having a positive electrode at one end of the battery and a negative electrode at the other end of the battery, said batteries overlapped with each other in a manner that electrodes having the different polarities are adjacent to each other;

a plurality of bus bars connecting the batteries in series by connecting the adjacent electrodes having the different polarities in the battery assembly; and a terminal having an electric contact part attached to each bus bar, and a wire connecting part continued to the electric contact part, and attached to an electric wire connected to a voltage measuring device for measuring a voltage of the battery, wherein the electric contact part of the terminal integrally includes a pair of press-contact terminals being connected by a joint plate, each press-contact terminal having a pair of clipping pieces, each pair of clipping pieces respectively being joined by a joint piece at one end of the clipping pieces, the pair of clipping pieces extending away from the joint piece and being disposed with a gap from each other to receive a bus bar of the plurality of bus bars in the gap, each press-contact terminal being connected to the bus bar by the clipping pieces press-inserting the bus bar in between the gap between the clipping pieces, and wherein the clipping pieces alone contact the bus bar and alone press-insert the bus bar between the clipping pieces, wherein an outermost end of the clipping pieces contacts the bus bar.

2. The power-supply device as claimed in claim 1, wherein the wire connecting part includes: a pair of side boards facing each other, and extending vertically from both edges of a bottom board to which the electric wire is arranged; and a press-contact blade projected inward from the side boards, and connected to a core wire of the electric wire by penetrating an insulating cover of the electric wire.

3. The power-supply device as claimed in claim 1 further comprising:

a plurality of first receiving parts configured to respectively receive the bus bars and the electric contact parts attached to the bus bars;

a plurality of second receiving parts continued to the first receiving parts, and configured to respectively receive the wire connecting parts to which the electric wires are attached; and a plate configured to be overlapped with the battery assembly, wherein each second receiving part includes: a bottom wall on which the wire connecting part to which the electric wire is attached is mounted; and a pair of side walls extending perpendicular from both edges of the bottom wall, and positioning the wire connecting part into between the side walls.

4. The power-supply device as claimed in claim 1, wherein the wire connecting part extends in a direction perpendicular to a longitudinal direction of the electric contact part, and extends along an outer periphery of the bus bar.

5. The power-supply device as claimed in claim 1, wherein the wire connecting part is folded back at a joint point with the electric contact part, and the wire connecting part and the electric contact part are overlapped with each other.

6. The power-supply device as claimed in claim 1, wherein the pair of clipping pieces are parallel to each other.

* * * * *